(No Model.)
P. B. VIELE.
HARROW TOOTH.
No. 294,292. Patented Feb. 26, 1884.
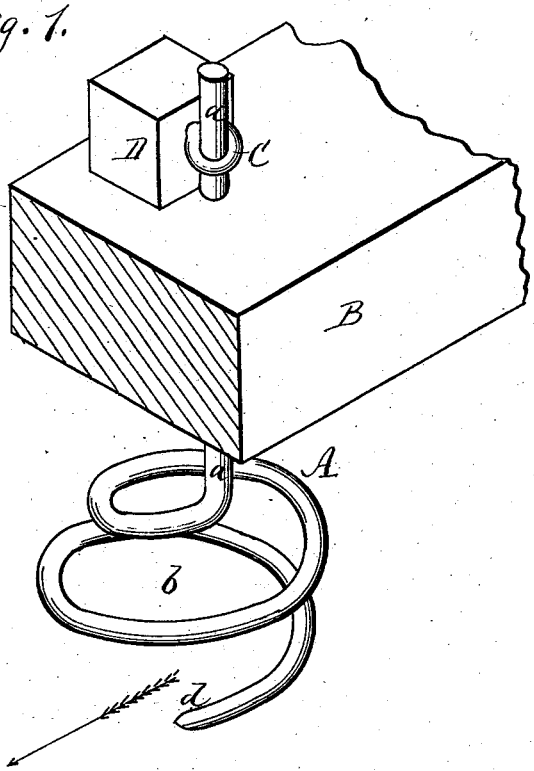
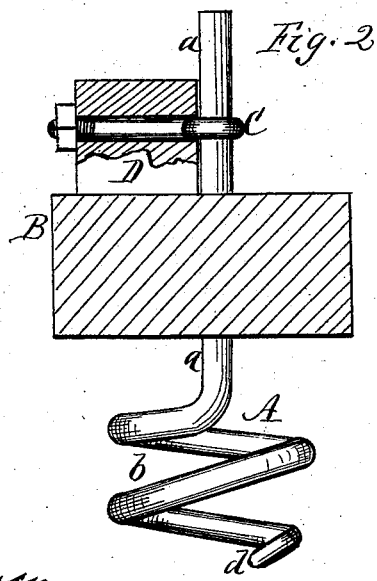
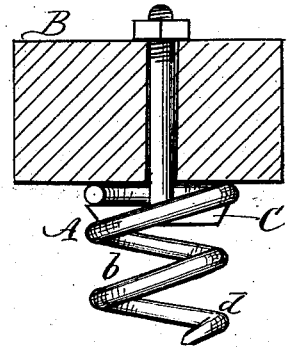
Attest.
Chas. F. Spencer
Inventor.
Platt B. Viele.
per R. F. Osgood.
atty

UNITED STATES PATENT OFFICE.

PLATT B. VIELE, OF ROCHESTER, NEW YORK.

HARROW-TOOTH.

SPECIFICATION forming part of Letters Patent No. 294,292, dated February 26, 1884.

Application filed December 17, 1883. (No model.)

*To all whom it may concern:*

Be it known that I, PLATT B. VIELE, of Rochester, Monroe county, New York, have invented a certain new and useful Improvement in Harrow-Teeth; and I do hereby declare that the following is a full, clear, and exact description of the same, reference being had to the accompanying drawings, in which—

Figure 1 is a perspective view of the tooth attached to one of the bars of the harrow. Fig. 2 is a front elevation of the same. Fig. 3 is a modification.

My improvement relates to harrow-teeth; and it consists of a tooth made from a rod or bar of metal with a straight shank and a point of spiral form, similar to a spiral spring, as hereinafter described.

It also consists in the combination, with the tooth, of a clamp which embraces the shank, and is drawn up against a stop, whereby the tooth is held in a stationary position, but can be adjusted axially to present the cutting-point forward as it wears away, as hereinafter described.

In the drawings, A shows the tooth, which is made from a rod or bar of metal, preferably steel, so as to have a degree of elasticity. It consists of a straight shank, $a$, which forms the upper portion, and a spiral body, $b$, which forms the lower portion, and is the part that cuts into the soil. This spiral body is coiled into the form of a spiral spring, two or three coils (more or less) being made, and the point $d$ being made to stand forward in the direction of motion, as shown in Fig. 1. The coils stand horizontally, and in passing through the soil they cut the whole width of the spiral.

B is one of the cross-bars of the harrow. The teeth are set in mortises in the bars in the usual way. The mortises, however, are preferably round, and the shanks of the teeth are cylindrical, so that they can be turned in the mortises for a purpose presently to be described.

C is a clamp, which embraces the shank of the tooth and secures it fast in place. It may be made of any desired form; but a simple eyebolt is preferably used, as shown, said eyebolt passing through a butment, D, and being tightened in place by a nut, which draws the shank up tight against the butment and fastens it in place. This clamp not only allows vertical adjustment higher or lower, but it also allows the axial turning of the tooth, so that as the projecting point $d$ wears away it can be turned to bring said point in line with the draft, as before described. To accomplish this it is only necessary to loosen the clamp, turn the tooth therein, and then tighten the clamp again.

The advantage of this tooth is that it cuts easily through the soil, makes a wide furrow or path, and is a most effective pulverizer, stirring and sifting the whole body of soil to the full depth at which it cuts. It does not cut through and push the soil to one side like a solid tooth, nor turn it over like a moldboard tooth, but breaks up and raises the soil its whole depth, leaving it in a finely-pulverized condition. In case of striking a stone or other obstruction, the tooth will spring and yield and pass over without causing shock. The point $d$ by standing forward opens the way, causing easy draft and preventing the clogging that might occur if the broad side of the spiral stood forward.

By the use of the clamp, as aforesaid, and by making the shank of the tooth to turn therein, the point $d$ can always be brought to the front as it gradually wears away.

Instead of the device above described, that shown in Fig. 3 may be used. In this case the spiral lower portion only of the tooth is used, the flat top resting against the under side of the bar and being held fast thereto by the T-headed clamp C, as shown. The tooth can be adjusted to bring the point forward by simply loosening the clamp. This is done by turning back the nut on top of the bar. The same result is accomplished as in the device first described.

Having described my invention, what I claim as new, and desire to secure by Letters Patent, is—

1. A harrow-tooth consisting of a spiral body provided with a projecting point at the lower end, the coils standing horizontally, as herein shown and described.

2. The combination of a harrow-tooth consisting of a spiral body provided with a projecting point at the lower end, and a clamp for securing the tooth fast to the supporting-bar, whereby the tooth can be adjusted axially to bring its point forward as it wears away, as set forth.

In witness whereof I have hereunto signed my name in the presence of two subscribing witnesses.

PLATT B. VIELE.

Witnesses:
WM. H. FARRAND,
BENJAMIN S. HEBARD.